US011609996B2

(12) United States Patent
Falk (10) Patent No.: US 11,609,996 B2
(45) Date of Patent: Mar. 21, 2023

(54) DATA PROCESSING APPARATUS, SYSTEM, AND METHOD FOR PROVING OR CHECKING THE SECURITY OF A DATA PROCESSING APPARATUS (71) Applicant: Siemens Aktiengesellschaft, Munich (DE)

(72) Inventor: Rainer Falk, Poing (DE)

(73) Assignee: Siemens Aktiengesellschaft, Munich (DE)

( * ) Notice: Subject to any disclaimer, the term of this patent is extended or adjusted under 35 U.S.C. 154(b) by 115 days.

(21) Appl. No.: 17/048,657

(22) PCT Filed: Apr. 12, 2019

(86) PCT No.: PCT/EP2019/059396
§ 371 (c)(1),
(2) Date: Oct. 19, 2020

(87) PCT Pub. No.: WO2019/206674
PCT Pub. Date: Oct. 31, 2019

(65) Prior Publication Data
US 2021/0326441 A1  Oct. 21, 2021

(30) Foreign Application Priority Data
Apr. 25, 2018 (EP) .................... 18169269

(51) Int. Cl.
G06F 21/57  (2013.01)
G06F 21/53  (2013.01)
(Continued)

(52) U.S. Cl.
CPC ............. *G06F 21/57* (2013.01); *G06F 21/53* (2013.01); *G06F 21/64* (2013.01); *H04L 9/32* (2013.01)

(58) Field of Classification Search
CPC .......... G06F 21/57; G06F 21/53; G06F 21/64; H04L 9/32
See application file for complete search history.

(56) References Cited

U.S. PATENT DOCUMENTS 8,300,811 B2  10/2012 Georgiades
8,531,247 B2   9/2013 Dichtl
(Continued)

FOREIGN PATENT DOCUMENTS

EP  2870565 A1  5/2015
EP  2891102 A1  7/2015
(Continued)

OTHER PUBLICATIONS

Anwar, Waqar, et al. "An alternate secure element access control for NFC enabled Android smartphones." 2014. International Journal for Information Security Research (IJISR) 4.11 391-399. (Year: 2014).*
(Continued)

*Primary Examiner* — Shin-Hon (Eric) Chen
*Assistant Examiner* — Ethan V Vo
(74) *Attorney, Agent, or Firm* — Lempia Summerfield Katz LLC (57) ABSTRACT An object of the disclosure is to simplify security enhancements based on trusted computing. For this, a first data processing apparatus configured to operate in accordance with one or more platform configuration is provided. The first data processing apparatus includes an attestation processor, a network interface, and a data storage device for storing validation data. The attestation processor is configured to establish attestation data that is indicative of a current platform configuration. The validation data facilitates a validity check of integrity data, which includes the attestation data. The first data processing apparatus is configured to provide the integrity and validation data.

12 Claims, 3 Drawing Sheets

(51) Int. Cl.
*G06F 21/64* (2013.01)
*H04L 9/32* (2006.01)

(56) References Cited

U.S. PATENT DOCUMENTS

| | | | |
|---|---|---|---|
| 8,843,761 B2 | 9/2014 | Meyer | |
| 8,892,616 B2 | 11/2014 | Dichtl | |
| 9,147,088 B2 | 9/2015 | Falk | |
| 9,584,311 B2 | 2/2017 | Meyer | |
| 2003/0188176 A1* | 10/2003 | Abbondanzio | G06F 21/305 713/191 |
| 2008/0244569 A1* | 10/2008 | Challener | G06F 9/45558 718/1 |
| 2008/0256595 A1 | 10/2008 | Schunter | |
| 2008/0288783 A1* | 11/2008 | Jansen | G06F 21/57 713/189 |
| 2009/0307487 A1* | 12/2009 | Mowa | G06F 21/57 713/156 |
| 2010/0082984 A1* | 4/2010 | Ellison | H04L 9/3236 713/170 |
| 2013/0061056 A1 | 3/2013 | Proudler | |
| 2013/0156180 A1 | 6/2013 | Hess | |
| 2015/0227744 A1 | 8/2015 | Horovitz | |
| 2015/0264080 A1 | 9/2015 | Busser | |
| 2015/0288659 A1* | 10/2015 | Lukacs | H04L 63/0227 713/2 |
| 2015/0341343 A1 | 11/2015 | Dichtl | |
| 2016/0147542 A1* | 5/2016 | Kishi | G06F 9/4418 713/2 |
| 2016/0164862 A1 | 6/2016 | Berger | |
| 2016/0253438 A1 | 9/2016 | BÖffgen | |
| 2020/0169413 A1 | 5/2020 | Aschauer | |

FOREIGN PATENT DOCUMENTS

| | | | |
|---|---|---|---|
| EP | 2605445 B1 | 9/2015 | |
| EP | 2976707 B1 | 2/2017 | |
| EP | 3028140 B1 | 8/2017 | |
| EP | 2870565 B1 | 9/2017 | |
| EP | 3413530 B1 | 7/2019 | |
| WO | WO-2004114528 A2 * | 12/2004 | G06F 21/554 |
| WO | 2017137256 A1 | 8/2017 | |

OTHER PUBLICATIONS

Trusted Computing Group, "TCG Guidance for Securing Network Equipment", Jul. 3, 2017, Version 1.0, Revision 26b (Year: 2017).*
European Search Report for European Application No. 18169269.0-1218 dated Aug. 2, 2018.
PCT International Search Report and Written Opinion of International Searching Authority dated Jun. 25, 2019 corresponding to PCT International Application No. PCT/EP2019/059396 filed Apr. 12, 2019.

* cited by examiner

FIG 1

100 - Data processing apparatus
110 - Attestation processor
120 - Network interface
130 - Data storage device
134 - Bundled component image
135 - Validation data
136 - Application
160 - Central processing unit
170 - Working memory

FIG 2

200 - Data processing apparatus
210 - Network interface
230 - Data storage device
236 - Application
238 - Application
260 - Central processing unit
270 - Working memory

FIG 3

1 - System
30 - Server
32 - Data storage device
34 - Software component image
36 - Software component
38 - Software component
40 - Data exchange network
42 - Internet
43 - Network interface
50 - Automation network
52 - Computing device
54 - Computing device
56 - Computing device 100 - Data processing apparatus
120 - Network interface
200 - Data processing apparatus
210 - Network interface
250 - Network interface

FIG 4

DATA PROCESSING APPARATUS, SYSTEM, AND METHOD FOR PROVING OR CHECKING THE SECURITY OF A DATA PROCESSING APPARATUS

The present patent document is a § 371 nationalization of PCT Application Serial No. PCT/EP2019/059396, filed Apr. 12, 2019, designating the United States, which is hereby incorporated by reference, and this patent document also claims the benefit of European Patent Application No. 18169269.0, filed Apr. 25, 2018, which is also hereby incorporated by reference.

TECHNICAL FIELD

The disclosure relates to the field of trusted or secure computing in a network environment, and more particularly, is directed to a method for proving the security of a first processing apparatus, a method for checking the security of a first data processing apparatus, a first data processing apparatus, a second data processing apparatus, and a system including the data apparatuses and/or configured to perform the methods.

BACKGROUND

Traditionally, data processing apparatuses, in particular computing devices such as personal computers or servers, have been designed with a focus on openness and interoperability. With the increasing use of data processing apparatuses in a network environment, in which several data apparatuses are connected to each other via network interfaces, and/or in multi-user scenarios the security of the data processing apparatuses became more relevant. Thus, in particular, data processing apparatuses have been provided with various modules, devices, or components to protect them against attacks such as an attacker trying to access and/or modify such a data processing apparatus or its software or spoof a communication between two data processing apparatuses.

Also, in recent years, there is rising interest in exchanging data, running applications, and providing services between data apparatuses, in particular a network environment. Moreover, while some of these have already been provided in a closed network of data processing apparatuses, there is a trend to provide and/or use data exchange, applications, and or services over Internet, which makes security even more relevant. In particular, such data exchange, applications, or services may be used for industrial applications and employ design data, simulation data, technical or medical diagnose data, control data or signals, financial data, and/or monitoring or controlling supply chain or logistics. For such usage scenarios, in particular, it is important to protect the data processing apparatuses connected to each other via a computer network, in particular Internet, against attacks and/or malfunctions and/or to provide modules or components to enable a data processing apparatus to trust another data processing apparatus, which communicates with it.

Various commercial, closed or public platforms, systems, and implementations exist that are directed to a secured data exchange between data processing apparatuses, in particular of distributed industrial sites. They may provide a so called "managed file transfer", which provides high security of transferred data, in particular of sensitive data like medical data or financial data or control for industrial sites. Such a secured transfer is in particular relevant in an automation environment, in which a manufacturing process is automated and controlled by such control data.

In order to enhance the security of a data processing apparatus, the data processing apparatus may use and/or implement various aspects of trusted computing.

A feature of trusted computing is secure or trusted boot, which allows a data processing apparatus implementing this feature to boot into a defined and trusted configuration, such that its current hardware configuration and/or software running on it (e.g., its platform configuration) is in a defined, and in particular authorized state.

Moreover, one of the features of trusted computing is integrity measurement, which allows to determine the hardware and/or software configuration as well as hash values of additional information, which at least partially define a current platform configuration, e.g., (loadable/loaded) executable code, configuration data or files, parameters like temperature of an environment of a data processing apparatus, or active users or processes. This may allow to determine integrity data or attestation data, which is indicative of a current platform configuration. Specifically, the determination may be performed at runtime, (e.g. within secure boot or at later operational stages of a data processing apparatus), and thus may provide data being indicative of not (just) a static platform configuration (e.g., of a switched off data processing apparatus) but of the operating/running data processing apparatus.

Another feature of trusted computing is so called remote attestation. Remote attestation is directed to provide information about a platform configuration, in which a remote data processing apparatus currently operates, to another data processing apparatus, such that the other data processing apparatus may trust the remote data processing apparatus depending on the provided platform configuration. In this way, the security for exchanging data with, running applications on, and/or using services of the remote data processing apparatus by the other data processing apparatus may be increased.

A known platform for secure data exchange, in particular for industrial applications, is the "industrial data space" (IDS), which is developed by several partners including Fraunhofer Gesellschaft. Sometimes, it is called also "international data space". In order to approve the security of a data exchange within the Industrial data space platform, this platform is designed to employ so called security gateways for the exchange of data, wherein the number of security gateways is limited and each security gateway is certified and/or each operator of one or more security gateways is certified or technically approved, thereby allowing it other security gateways or other data processing apparatuses of this platform to trust those certified/approved security gateways.

Moreover, the following documents are known: U.S. Pat. No. 8,531,247 B2; U.S. Pat. No. 8,892,616 B2; U.S. Pat. No. 8,300,811 B2; U.S. Pat. No. 9,147,088 B2; U.S. Pat. No. 9,584,311 B2; EP 2976707 B1; EP 2 605 445 B1; EP 2 870 565 A1; EP 2 891 102 A1; WO 2017/137256 A1; EP 2870565 B1; EP 3028140 B1; EP 17175275; and U.S. Pat. No. 8,843,761 B2.

SUMMARY AND DESCRIPTION

It is an object of the disclosure to improve the security of a data processing apparatus and of a system with data processing apparatuses, which may communicate with each other via network interfaces, and more particularly, to simplify improving security enhancements based on trusted computing and/or based on information indicative of a platform configuration, in which a data processing apparatus may operate.

The scope of the present disclosure is defined solely by the appended claims and is not affected to any degree by the statements within this summary. The present embodiments may obviate one or more of the drawbacks or limitations in the related art.

A first aspect of the present disclosure is directed to a first data processing apparatus, which is configured to operate in accordance with one or more platform configuration. The first data processing apparatus includes an attestation processor, a network interface, and a data storage device for storing validation data. The attestation processor is configured to establish attestation data that is indicative of a current platform configuration of the one or more platform configurations. Furthermore, the validation data facilitates a validity check of integrity data, wherein the integrity data at least includes the attestation data. Moreover, the first data processing apparatus is further configured to provide the integrity data and the validation data to a second processing apparatus via the network interface.

In the sense of the present disclosure, a "data storage device" is an apparatus configured to store data and/or to retrieve data, which have previously been stored on it. In particular, the data storage device may retrieve data from a data storage medium, wherein this data may have been stored on the data storage medium by another device. Also, in particular, the data storage device may store the data on a data storage medium such as a magnetic disc, an optical disc, electronic circuits, which may include current stores and/or capacitors and/or phase changing material. In particular, a hard disk, a flash memory, random access memory, a solid state disk, or an optical disk with a writing or reading device for it is a data storage device in the sense of the present disclosure.

Within the meaning of the present disclosure, a "platform configuration" may refer to a state in which a data processing apparatus may operate. In particular, such a state may include a hardware configuration of the data processing apparatus, a state of the hardware, a software configuration of the data processing apparatus, a state of the software configuration, (such as the software e.g., applications, modules, or components of it, which run on the data processing apparatus), or a combination thereof. A "current platform configuration" may refer to a platform configuration, in which the data processing apparatus currently operates. In particular, this may include the hardware of the data processing apparatus including the existence and operational state of some or all of its components like extension cards, network interfaces, processors, storage devices, user interfaces or a housing, software, which is installed on the data processing apparatus, and/or whether a software (e.g., an operating system, an application, a hypervisor, a software state, or the like) is currently loaded, its operational state (e.g., whether it is currently running) and/or the specific versions of the software. In particular, checksums like hash values of the software (e.g., applications, operating systems, etc.) may be calculated, when they are loaded and/or during runtime to provide the platform configuration or at least a part of it. Also, the physical integrity of one or more components may be verified using tamper sensors, and a checksum may be determined based on the tamper sensor measurements.

An advantage of providing the integrity data particularly may be that, based on the integrity data and the attestation data of it, the current platform configuration of the first data processing apparatus may be checked, thus in particular facilitating a check whether the first data processing apparatus is secure, e.g., currently operates in a platform configuration which is secure. Moreover, the validation data advantageously allows to perform a validity check of the integrity data, thereby in particular allowing to check whether the current platform configuration, which is indicated by the integrity data, is a secure one. In this way, the security may be improved, in that not just the current platform configuration may be determined but also whether this platform configuration is secure according to the validity data.

A further advantage may be, that both the integrity data and the validation data are provided by the first data processing apparatus, thereby reducing complexity compared to other implementations of trusted or secure computing, in which integrity data and validation data are managed, distributed, or generated in another, in particular separated way.

For example, for such a system, in which integrity and validation data are separated, including M first data processing apparatuses and N second data processing apparatuses, wherein each of the first data processing apparatuses provides its integrity data but not its validation data and wherein each of the second data processing apparatuses therefore needs to store and/or manage all M validation data, the complexity is M×N.

In contrast to this, by providing both, the validation data and the integrity data by one data processing apparatus (e.g., the first data processing apparatus), the complexity may be reduced and, in some advantageous implementations, may be M+1. In this advantageous way, improving the security based on information being indicative of the current platform configuration (e.g., integrity data or attestation data) is less complex and/or facilitated.

According to some embodiments, the first data processing apparatus may be configured to run at least one software component. The at least one software component is selected from a group including: an application, which provides stored and/or computed application data to and/or which requests application data from the second data processing apparatus; a hypervisor; a virtual machine; an operating system; and/or a data space runtime environment. Furthermore, the first data processing apparatus is configured to provide the integrity data and the validation data, such that the integrity data and the validation data are specific for the at least one software component. Thereby, the security of the first data processing apparatus may be proved specifically for the at least one software components additionally or alternatively to proving the general/overall security of the first data processing apparatus by providing generic integrity and validation data. Moreover, in some advantageous modifications, a chain of security proves may be established by providing integrity and validation data for each part of chain regarding security of this first data processing apparatus, such as the generic security of the first data processing apparatus with respect to its hardware, firmware and/or operational state, the security of a hypervisor running on the hardware, the security of a virtual machine running on the first data processing apparatus and being managed by the hypervisor, the security of an operating system running in the virtual machine, specifically the current platform configuration and/or part of it regarding this operating system, and an application running within this operating system. In this advantageous way, it may be checked whether all links of the chain regarding the security of the first data processing apparatuses are actually secure. Furthermore, it may advantageously allow to run different software components with a differing security status, such as one application which is secure and another application, (e.g., isolated in another virtual machine), which is not secure. For this non-secure application, no integrity or validation data may be provided, while for the secure application specific integrity and validation data is provided.

In some embodiments, in which the validation data is specific for the at least one software component, the at least one software component and the validation data being specific for the at least one software component are bundled to a bundled component image. Furthermore, the first data processing apparatus is configured to receive the bundled component image, to store the bundled component image on the data storage device, and to retrieve the software component of the bundled component image from the data storage device for running the at least one software component. According to some advantageous modifications, the first data processing apparatuses may be configured to receive the bundled component image from a server for component images. Thereby, the at least one software component and its specific validation data may be handled as one entity, whereby improving security may be facilitated.

In some embodiments, in which the at least one software component and the validation data being specific for the at least one software component are bundled into the bundled component image, the bundled component image may be digitally signed by a first digital signature. Furthermore, the first data processing apparatus may be configured to verify the bundled component image based on the first digital signature, and to selectively run the software component of the bundled component depending the verifying of the bundled component image. Thereby, the security of the first data processing apparatuses and/or a security of the second data processing apparatus being in communication with the first data processing apparatus may be improved. In particular, the first digital signature and verifying the bundled component image based on the first digital signature may provide a defense against an attacker trying to infiltrate the first data processing apparatus by a modified software component.

According to some embodiments, signing by a digital signature, verifying based on a digital signature, and/or a digital signature may be implemented by asymmetric encryption, in particular by a private key and a public key. In such implementations, the private key may be used for digitally signing some data, while the public key may be used to verify digital signature of this data being signed by the private key. Consequently, the private key may be kept private and/or secret, while the public key may be distributed to other data processing apparatuses to facilitate the verifying.

Additionally or alternatively, in some embodiments, digitally signing may be implemented by one time keys.

Moreover, in some embodiments, digital signing may also be implemented by another method for digital signing.

According to some embodiments, the first data processing apparatus is configured to provide the validation data being specific for the at least one software component by retrieving it from the data storage device. Thereby, computing effort may be reduced.

In some embodiments in which the first data processing apparatus is configured to provide at least one of the integrity data and the validation data being specific for the at least one software component, the first data processing apparatus is configured to run an integrity module and/or a validity module of the at least one software component. In some advantageous modifications, the integrity module is configured to establish specific integrity data by the attestation processor, such that the first data processing apparatus may provide this specific integrity data. In some advantageous modifications, the validity module is configured to establish specific validation data by selecting and retrieving specific validation data from the data storage device, such that the first data processing apparatus may provide this specific validation data. Providing the integrity data by running the integrity module or providing the validation data by running the validity module may advantageously allow to modularize establishing integrity data or validity data, whereby complexity may be reduced and specific requirements for the at least one software component may be implemented as part of or at least linked to the software component, in particular as a module of the at least one software component.

According to some embodiments, the attestation processor includes at least one of the following group: a trusted platform module (TPM), a cryptoprocessor, a processor, and/or a data interface.

The cryptoprocessor is configured to determine the current platform configuration and to generate the attestation data based on the current platform configuration.

The processor is configured to run a firmware or software module of the first data processing apparatus, which is configured to determine information indicative of the current platform configuration and to generate the attestation data based on this information. Such a processor may advantageously allow modification of the attestation method via the firmware or software module (e.g., an update of it), whereby administration and/or operation of the first data processing apparatus including such a processor may be facilitated. The data processor may include a trusted execution environment, (e.g., ARM TrustZone or Intel SGX), in which the firmware or software module is executed.

The data interface is configured to receive the attestation data from a hardware security module, wherein the hardware security module is configured to detect information indicative of a current platform configuration and to generate the attestation data based on this information. By receiving the attestation data via the data interface, one may advantageously use a data processing apparatus as the first data processing apparatus, which does not support a crypto processor or a trusted platform. This may particularly be the case for an embedded system. Furthermore, receiving the attestation data via the data interface may also be combined with the other devices or components of the group, whereby security may be further increased.

In some beneficial implementations, the trusted platform module may be implemented in accordance to the standard ISO/IEC11889 or a later standard of the trusted computing group, wherein the first data processing apparatus may be configured to use and comply with the trusted platform module in accordance with this standard.

In some advantageous modifications, the hardware security module may be included by the first data processing apparatus or may be external to it. In some advantages modifications, the hardware security module may include one or more sensor devices to detect information indicative of the physical integrity of the first data processing apparatus such as a state of the housing of the first data processing apparatus or such as one or more images (e.g., a video) of the physical environment of the first data processing apparatus or the state of a physical tamper protection envelope (e.g., wire mesh) or of a protective coating or a tamper-protecting physical enclosure.

Within the meaning of the present disclosure, the term "comprising" may refer to a first mean comprising a second mean—e.g., the second mean being a part of the first mean. "Comprising" may also refer to the first mean at least essentially consisting of a second mean. Moreover, "comprising" may also refer to the first mean being implemented by the second mean. Moreover, a first mean comprising a second mean and a further mean may consist of or depend on both, the second mean and the further mean.

A second aspect of the disclosure is directed to a second data processing apparatus, wherein the second data processing apparatus includes a network interface. Furthermore, the second data processing apparatus is configured to receive integrity data from a first data processing apparatus via the network interface. Moreover, the second data processing apparatus is also configured to receive validation data from the first data processing apparatus via the network interface. Additionally, the second data processing apparatus is configured to perform a security check of the first data processing apparatus, wherein the security check at least includes a validity check of the integrity data based on the validation data.

The embodiments, advantageous modifications, and further improvements as already described in detail above in connection with the first aspect as well as potential benefits and advantages also apply correspondingly to the second data processing apparatus.

Moreover, receiving both the integrity data and the validation data from the first data processing apparatus may advantageously allow to reduce the complexity for implementing secure or trusted computing and, in particular, for remote attestation. Another advantage, (e.g., of performing the security check which includes and depends on the validity check), may be that the validation data specifically facilitates the validity check of the integrity data. The validation data may provide/include, in some beneficial embodiments, information regarding platform configurations, in accordance with which the first data processing apparatus may operate, that are secure. Thereby, a discrimination between secure and non-secure platform configurations based on local data (e.g., the validation data) may beneficially be facilitated.

A third aspect of the disclosure is directed to a system including a first data processing apparatus and a second processing apparatus, the first data processing apparatus according to the first aspect and the second data processing apparatus according to the second aspect.

The embodiments, advantageous modifications, and further improvements as already described in detail above in connection with the preceding aspects as well as potential benefits and advantages also apply correspondingly to the system.

According to some embodiments, the first data processing apparatus is configured to provide application data, which is stored on the data storage device or another data storage device of the first processing apparatus or computed by running at least one software component. Furthermore, the first data processing apparatus may be configured to provide the application data to the second data processing apparatus via its network interface.

According to some embodiments, the second data processing apparatus may be configured to selectively receive and/or process application data from the first data processing apparatus depending on the security check.

In particular, by providing the application data to the second data processing apparatus, the first and the second data processing data apparatuses, or the system including both apparatuses, may form a data exchange network or a part of a data exchange network.

Furthermore, the security of the system may advantageously be improved by receiving and/or processing application data from the first data processing apparatus depending on the security check. Thus, in particular, receiving or processing application data from an unsecure source, especially from the first data processing apparatus being in an unsecure platform configuration, may be avoided.

According to some embodiments the first data processing apparatus and/or the second data processing apparatus may include or may be designed as gateway servers for a data exchange network. According to some advantages, modifications the first and/or the second data processing apparatus(es) may be formed as a gateway server of an industrial data space.

Some embodiments of a gateway server may be configured to establish a data connection via a network interface to a first or a second data processing apparatus. Furthermore, such a gateway server may be configured to establish a data connection to other computing devices via the same network interface or via another network interface. According to some advantageous modifications, the gateway server may be configured to receive and/or provide data to such other computing devices and to act as a gateway to a data exchange network, in particular to forward data from such computing devices to a second or a first data processing apparatus, or vice versa. Thereby, the other computing devices and/or the first or the second data processing apparatus, in between which the gateway server acts as a gateway, and their security may be improved by, in particular, forwarding data from or to the first or the second data processing apparatus depending on the security check.

According to some embodiments, the first data processing apparatus is configured to receive the application data from the second processing apparatus via its network interface.

According to some embodiments, the second data processing apparatus includes a data storage device for application data and/or is configured to run one or more application which provides stored and/or computed application data.

In some embodiments of the second data processing apparatus, in which the second data processing apparatus includes a data storage device for application data, the second data processing apparatus is configured to selectively provide application data to the first data processing apparatus depending on security check.

In some embodiments, in which the second data processing apparatus is configured to run one or more applications, the applications are configured to selectively provide application data to the first data processing apparatus depending on the security check.

Thereby, providing application data to the first data processing apparatus, when it does not pass the security check, may be avoided.

According to some embodiments, the validation data includes information being indicative of at least one predefined valid platform configuration of the one or more platform configurations of the first data processing apparatus.

In some embodiments, in which the validation data may include information being indicative of at least one predefined valid platform configuration of the one or more platform configurations of the first data processing apparatus, the second data processing apparatus may be configured to perform the validity check by determining whether the attestation data matches with the at least one predefined valid platform configuration. Thereby, information regarding a valid platform configuration, which is a secure platform configuration, (e.g., the predefined platform configuration), may be provided.

According to some embodiments, the first data processing data apparatus may be configured to generate measurement data based on the type and scope of how the current platform configuration has been measured for establishing the attestation data. Thereby, the current platform configuration of the first data processing apparatus is not only indicated via the attestation data, but also it may be reconstructed how the attestation data has been established.

According to some advantageous modifications, the first data processing apparatus may further be configured to provide the integrity data, wherein the integrity data also includes the measurement data.

Providing measurement data may advantageously allow to trace through which platform configurations the current platform configuration was arrived and what would be an expected attestation data for this path. In particular, an attestation data arrived via one path might be different from attestation data arrived by another path (e.g., by loading applications or software in a different order) while both attestation data may indicate a valid platform configuration, in particular an equal or the same platform configuration. Thus, in particular, the complexity may be reduced by summing up differing attestation data and classifying them as indicating one platform configuration, in particular the at least one predefined configuration.

According to some embodiments, in which the measurement data is provided and/or in which the integrity data includes the measurement data, the second data processing apparatus may be configured to perform an integrity check by determining whether the attestation data matches the measurement data. Furthermore, the security check may include the integrity check, such that the security check depends on both, the validity check, and the integrity check.

According to some embodiments, the validation data is digitally signed by a second digital signature.

According to some embodiments, the first data processing apparatus is configured to verify the validation data based on the second digital signature. Furthermore, the first data processing apparatus is configured to selectively provide the integrity data and/or the validation data and/or the application data and/or request the application data depending on the verifying of the validation data.

In some embodiments, in which the validation data is digitally signed, the second data processing apparatus is configured to verify the validation data based on the second digital signature. Moreover, the security check includes and depends on the verifying of the validation data.

Thereby, spoofing attacks to the validation data may be made more difficult and, in certain examples, may be avoided. In some advantageous modifications, the digital signature, (e.g., a public key of or for the second digital signature), may be provided by a trusted entity or organization. While this second digital signature still has to be distributed to the second data processing apparatus or M second data processing apparatuses, it is still the same second digital signature for all second data processing apparatuses such that distributing this digital signature is less complex and requires an effort than distributing each validation data to each of the M second data processing apparatuses. Therefore, the second digital signature may be used to sign several validation data.

According to some embodiments, in which a first and a second digital signature is used, the first and the second digital signature are the same. Thereby, a trusted entity or organization may sign and/or distribute both, the images of software components, and the respective validation data.

According to some embodiments, the attestation processor, in particular of the first data processing apparatus, is configured to digitally sign the integrity data by a third digital signature.

In some embodiments, in which the integrity data is signed by a third digital signature, the first data processing apparatus is configured to verify the integrity data based on the third digital signature. Furthermore, the first data processing apparatus is configured to selectively provide the integrity data and/or the validation data and/or the application data and/or requests the application data depending on the verifying of the integrity data. Thereby, the security of the system may be enhanced and/or errors caused by a missing or invalid third digital signature (e.g., causing a verification of the integrity data based on the third digital signature to fail) may be avoided. In some advantageous modifications, therefore the first data processing apparatus will not provide data (e.g., integrity data, etc.), to the second data processing apparatus, when the verifying of the integrity data fails, and thus, interaction, in particular communication between the first and the second data processing apparatus requiring the security check will fail early.

In some embodiments, in which the integrity data is signed by a third digital signature, the second data processing apparatus is configured to verify the integrity data based on the third digital signature. Furthermore, the security check includes and depends on the verifying of the integrity data.

By verifying the integrity data, (e.g., by the third digital signature), spoofing the integrity data, or more particular the attestation data may be made more difficult or, in certain examples, avoided. In advantageous modifications, the attestation processor of the first data processing apparatus may therefore be used to provide a certain trust level for the first data processing apparatus. In particular, the attestation processor may be provided by a trusted entity or organization and/or may be cryptographically and/or physically secured.

According to some embodiments, the first, second, and/or third digital signature may be equal.

According to some embodiments, a server for component images may be provided.

The server for component images is configured to provide one or more images of software components, which may run on the first data processing apparatus, wherein one or more of these software components are each bundled with validation data into a bundled component image, the respective validation data being specific for the respective software component.

According to some embodiments, the system may include such a server component images.

Thereby, images of software components and bundled component images may be provided to data processing apparatuses of the system, which may facilitate improving the security of the system by utilizing trusted computing. Moreover, the respective validation data may advantageously be provided by the server for component images, too.

According to some embodiments, the server for component images may be configured to verify at least one of the bundled component images based on a digital signature, in particular the first digital signature.

A fourth aspect of the disclosure is directed to a method for proving the security of a first data processing apparatus. The method includes establishing attestation data by an attestation module or component of the first data processing apparatus, wherein the attestation data is indicative of a current platform configuration of one or more platform configuration, in accordance of which a first data processing apparatus is configured to operate. The method further includes providing integrity data to a second data processing apparatus, wherein the integrity data at least includes the attestation data. The method further includes providing validation data to the second data processing apparatus, wherein the validation data facilitates a validity check of the integrity data.

The embodiments, advantageous modifications, and further improvements as already described in detail above in connection with the preceding aspects as well as potential benefits and advantageous also apply correspondingly to the method for proving the security of a first data processing apparatus.

A fifth aspect of the disclosure is directed to a method for checking the security of a first data processing apparatus. The method includes receiving integrity data from the first data processing apparatus. The method further includes receiving validation data from the first data processing apparatus, too. Additionally, the method includes performing a security check of the first data processing apparatus. The security check at least includes a validity check of the integrity data based on the validation data.

The embodiments, advantageous modifications, and further improvements as already described in detail above in connection with the preceding aspects as well as potential benefits and advantageous also apply correspondingly to the method for checking the security of a first data processing apparatus.

The above summary is merely intended to give a short overview over some features of some embodiments and implementations and is not to be construed as limiting. Other embodiments may include other features than the ones explained above.

BRIEF DESCRIPTION OF THE DRAWINGS

The above and other embodiments, advantageous modifications, further improvements, elements, features, acts, and characteristics of the present disclosure will be more apparent form the following detailed description of exemplary embodiments and the appended figures. When not stated otherwise or following otherwise from the context, like reference signs refer to corresponding apparatuses, elements or features of the exemplary embodiments and throughout the figures.

DETAILED DESCRIPTION

In the following, various embodiments of the disclosure will be described in detail with reference to the appended figures. It is to be understood that the following description of embodiments is not to be taken in a limiting sense. The scope of the disclosure is not intended to be limited by the embodiments described hereinafter or by the figures, which are taken to be illustrative only.

The figures are to be regarded as being schematic representations and elements illustrated in the figures, which are not necessarily shown to scale. Rather, the various elements are represented such that their function and general purpose become apparent to a person skilled in the art. Any connectional coupling between functional blocks, devices, components or other physical of functional units shown in the figures or described herein may also be implemented by indirect connectional coupling. A coupling between components may be established over a wireless connection. Functional blocks may be implemented in hardware, firmware, software, or a combination thereof.

Figure 1:
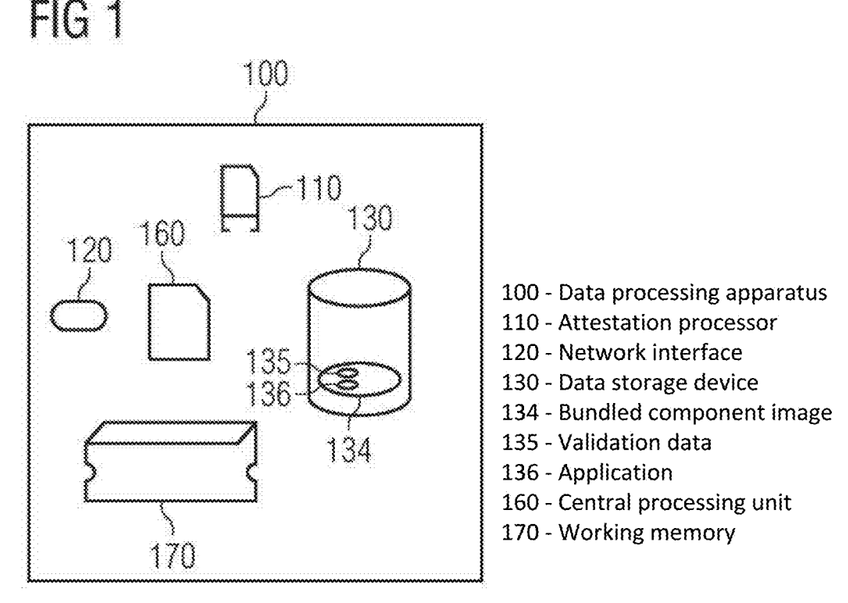
FIG. 1 schematically illustrates a first data processing apparatus according to an embodiment.

In FIG. 1, a first data processing apparatus 100 according to an embodiment is schematically shown.

According to an exemplary embodiment, the first data processing apparatus 100 is configured to operate in accordance with one or more platform configurations. The first data processing apparatus 100 includes an attestation processor 110, which is configured to establish attestation data, wherein the attestation data is indicative of a current platform configuration of the one or more platform configuration. Furthermore, the first data processing apparatus includes a network interface 120 and a data storage device 130 for storing validation data. The validation data facilitates a validity check of integrity data, wherein the integrity data at least includes the attestation data. Moreover, the first data processing apparatus is configured to provide the integrity data and the validation data to a second data processing apparatus via the network interface 120.

According to some advantageous modifications, in particular for providing the integrity and the validation data, the first data processing apparatus 100 may further include a central processing unit 160 and working memory 170. According to some advantageous modifications, the first data processing apparatus 100 may be implemented as a personal computer or a server computer such as computers based on Intel's XEON-platform or an IBM-Power-9-System or an ARM Cortex A processor.

According to some advantageous modifications, the attestation processor 110 may be implemented as a trusted platform module (TPM).

According to an exemplary embodiment, the first data processing apparatus 100 furthermore may be configured to run at least one software component, (e.g., an application), which provides stored and/or computed application data to and/or which requests application data from a second data processing apparatus. Moreover, the first data processing apparatus is configured to provide the integrity data and the validation data, such that the integrity data and the validation data are specific for the at least one software component e.g., the application. Particularly for that purpose, the first data processing apparatus 100 may run the application on the central processing unit 160 and use the working memory 170.

Moreover, according to some advantageous modifications, (e.g., of the first data processing apparatus being in an operating state), the data storage device 130 may include a physical representation of a bundled component image 134 (as depicted in FIG. 1), wherein the bundled component image 134 is a bundle of the at least one software component 136 (e.g., the application 136) and the validation data (e.g., a physical representation of it 135) that is specific for the at least one software component. So, the first data processing apparatus 100 may be configured to load the at least one software component 136 from the data storage device 130 to the working memory 170 and to run it by the central processing unit 160.

Also, the first data processing apparatus 100 may be configured to provide the validation data 135 being specific for the at least one software component 136 to the second data processing apparatus via the network interface 120.

Moreover, according to some advantageous modifications, the bundled component image 134 may be digitally signed by a first digital signature. Furthermore, in some implementations, the first data processing apparatus 100 may be advantageously configured to verify the bundled component image 134 based on the first digital signature, in particular by its central processing unit 160 and its working memory 170. Furthermore, in some implementations, the first data processing apparatus 100 may be beneficially configured to selectively run the software component 136 of the bundled component image 134 depending on the verifying of the bundled component image.

Figure 2:
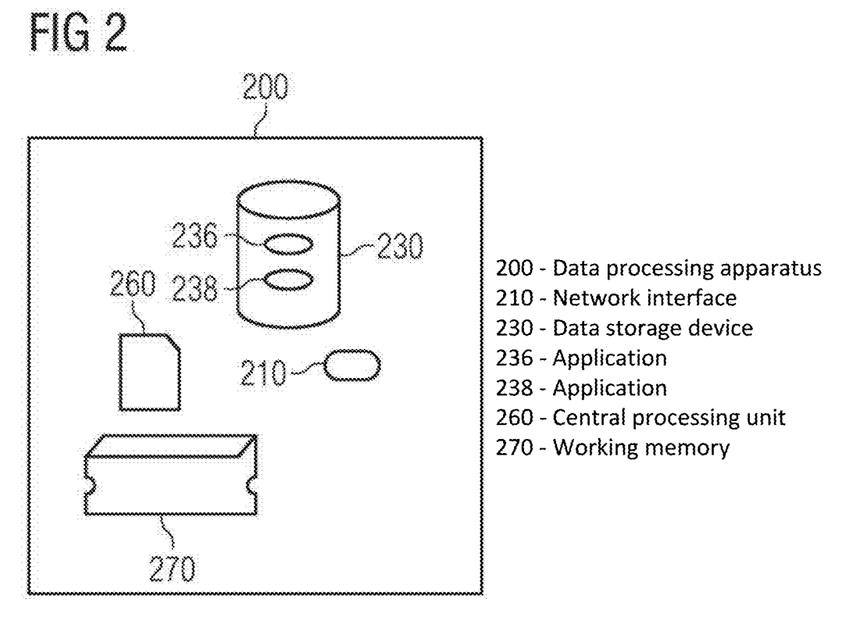
FIG. 2 schematically illustrates a second data processing apparatus according to an embodiment.

FIG. 2 schematically illustrates a second data processing apparatus 200 according to an embodiment.

According to an exemplary embodiment, the second data processing apparatus 200 includes a network interface 210. Moreover, the second data processing apparatus 200 is configured to receive integrity data from a first data processing apparatus via the network interface 210. In some advantageous modifications, the first data processing apparatus is according to an embodiment, and may be according to an exemplary embodiment of the first data processing apparatus 100 given with reference to FIG. 1. The second data processing apparatus 100 is further configured to also receive validation data from the first data processing apparatus via the network interface 210. Moreover, the second data processing apparatus 200 is further configured to perform a security check of the first data processing apparatus, wherein the security check at least includes a validity check of the integrity data based on the validation data.

According to some advantageous modifications, in particular for performing the security check, the second data processing apparatus 200 may include a central processing unit 260 and a working memory 270.

According to some advantageous modifications, the second data processing apparatus 200 may be implemented as a personal computer or server computer, which may be based on Intel's XEON-Platform or IBM's Power-9 platform or an ARM Cortex A processor.

In an exemplary embodiment, the second data processing apparatus 200 may further be configured to run one or more applications, which provide application data (e.g., data computed by the respective applications or stored for/by the respective applications) to the first data processing apparatus and/or which receive application data (data computed by or stored for an application running on a first data processing apparatus) from the first data processing apparatus. Furthermore, the second data processing apparatus is configured to selectively provide or receive the application data depending on the security check of the first data processing apparatus. For this purpose, according to some advantageous modifications, the second data processing apparatus 200 may include a data storage device 230 and/or may be configured to run the application by the central processing unit 260 and the working memory 270. Moreover, in some advantageous modifications, in particular, when the second data processing apparatus is in an operating state, one or more applications may be readily stored on the data storage device 230, and thus, the data storage device 230 may include a physical representation (e.g., specific magnetic domains in case of a magnetic storage device such as a hard disk) of the application 236, 238.

According to an advantageous modification, the second data processing apparatus 200 may be configured to provide and/or receive the application data via the network interface 210.

In some embodiments, the second data processing apparatus 200 may be further configured to also operate as a first data processing apparatus according to an embodiment of the present disclosure, and thus, in particular may be configured to run and/or may store corresponding applications.

Figure 3:
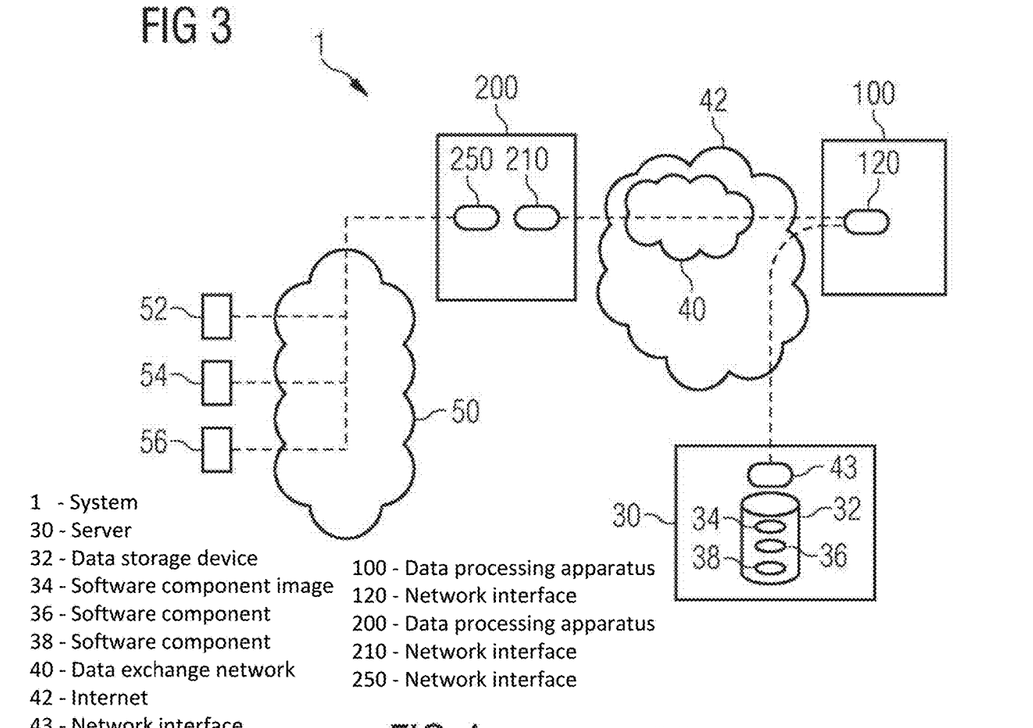
FIG. 3 schematically illustrates a system including a first data processing apparatus, a second data processing apparatus, and a server for component images according to an embodiment.

FIG. 3 schematically illustrates a system 1 including a first data processing apparatus 100 and a second data processing apparatus 200, each according to an embodiment.

According to an exemplary embodiment, the system 1 further includes a server 30 for component images. The server for component images is according to an embodiment of the present disclosure. Moreover, the first data processing apparatus 100 may be according to an exemplary embodiment of the first data processing apparatus 100 given with reference to FIG. 1 and/or the second data processing apparatus 200 may be according to an exemplary embodiment of the second data processing apparatus 200 given with reference to FIG. 2.

According to some advantageous modifications, the server for component images 30 may include a data storage device 32 and a network interface 43. In some advantageous implementations, the server 30 may be implemented as a personal computer or a server computer. Moreover, in some modifications, in particular, when the server 30 is in an operating state, the data storage device 32 may include physical representations of images of software components 36, 38 and at least one bundled software component image 34, which includes a software component, wherein the software components of the images 36, 38 or of the at least one bundled component image 34 may be run on the first data processing apparatus 100.

In an exemplary embodiment, the second data processing apparatus 200 may further be implemented as a gateway server and/or further include a further network interface 250. Furthermore, the system 1 may include one or more computing devices 52, 54 and 56. Some of the computing devices 52, 54, 56 may be implemented as automation devices and/or be configured for monitoring, controlling, regulating, and/or executing a physical process. The second data processing apparatus 200 and the computing devices 52, 54, 56 may be connected with each other via a data connection and/or be configured to establish such a data connection via the further network interface 250 and/or via respective network interfaces of the computing devices 52, 54, 56, such that in some advantageous modifications, they may be connected via an automation network 50 and/or implement the automation network 50, wherein the second data processing apparatus 200 is configured to act as a gateway for data of the computing devices 52, 54, 56 and to receive data from the computing devices via its network interface 250 and to forward it to the first data processing apparatus 100 via its network interface 210 and/or to receive data from the first data processing apparatus 100 via network interface 210 and to forward it to the computing devices 52, 54, 56 via its further network interface 250.

According to some advantageous modifications, the first and/or the second data processing apparatus 100, 200 may be configured to establish a data connection between each other by their network interfaces 120, 210. In some beneficial implementations, the first and the second data processing apparatus 100, 200 may be connected to each other via a data exchange network 40, e.g., their data connection between each other uses the data exchange network 40 and/or the first and the second data processing apparatus 100, 200 together with additional devices, in particular network equipment, may form the data exchange network 40. Alternatively to forming the data exchange network 40 or as an additional implementation, the data exchange network 40 may be implemented by devices or components of or being part of Internet 42, the Internet 42 not being part of the system 1.

According to some advantageous modifications, the server 30 for component images may be configured to establish a data connection to the first data processing apparatus 100 by the network interface 43, and in particular via Internet 42. Correspondingly, in some advantageous modifications, the first data processing apparatus 100 may be configured to establish a data connection to the server 30 by the network interface 120, and in particular via Internet 42.

Figure 4:
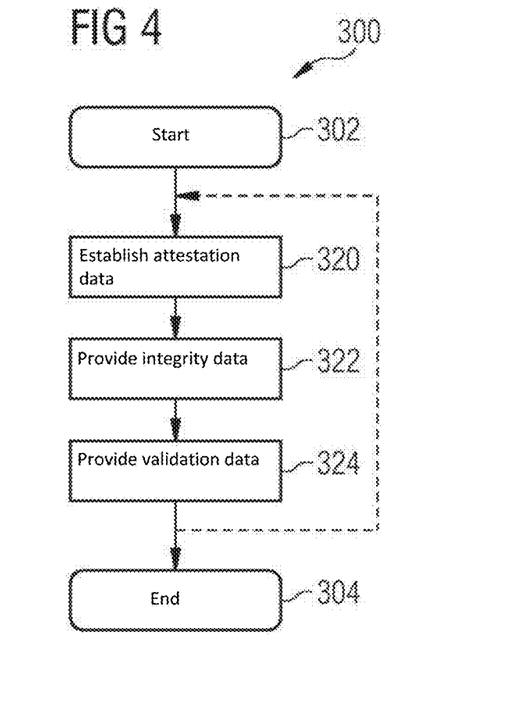
FIG. 4 represents a flowchart of a method for providing the security of a first data processing apparatus according to an embodiment.

FIG. 4 represents a flowchart of a method 300 for proving the security of a first data processing apparatus, the method 300 according to an embodiment.

In an exemplary embodiment the method 300 includes the method acts 320, 322, and 324. The method 300 begins at the start of the method 302 and ends at the end of the method 304. Furthermore, one or more of the method acts, in particular a sequence of method acts or the whole method may repeatedly performed. Moreover, the first data processing apparatus is according to an embodiment of the present disclosure, and may be according to an exemplary embodiment of the first data processing apparatus 100 given with reference to FIG. 1.

At act 320, attestation data is established by an attestation module or component of the first data processing apparatus, wherein the attestation data is indicative of a current platform configuration of one or more platform configurations, in accordance with which the first data processing apparatus is configured to operate. According to some advantageous modifications, the attestations module or component may be implemented as the attestation processor 110 of the first data processing apparatus 100.

At act 322, integrity data is provided to a second data processing apparatus. The integrity data at least includes the attestation data, which has been established by the attestation module or component. According to some advantageous modifications, the second data processing apparatus is according to an embodiment, and may be according to an exemplary embodiment of the second data processing apparatus 200 given with reference to FIG. 2.

At act 324, validation data is provided to the second data processing apparatus, wherein the validation data facilitates a validity check of the integrity data.

Figure 5:
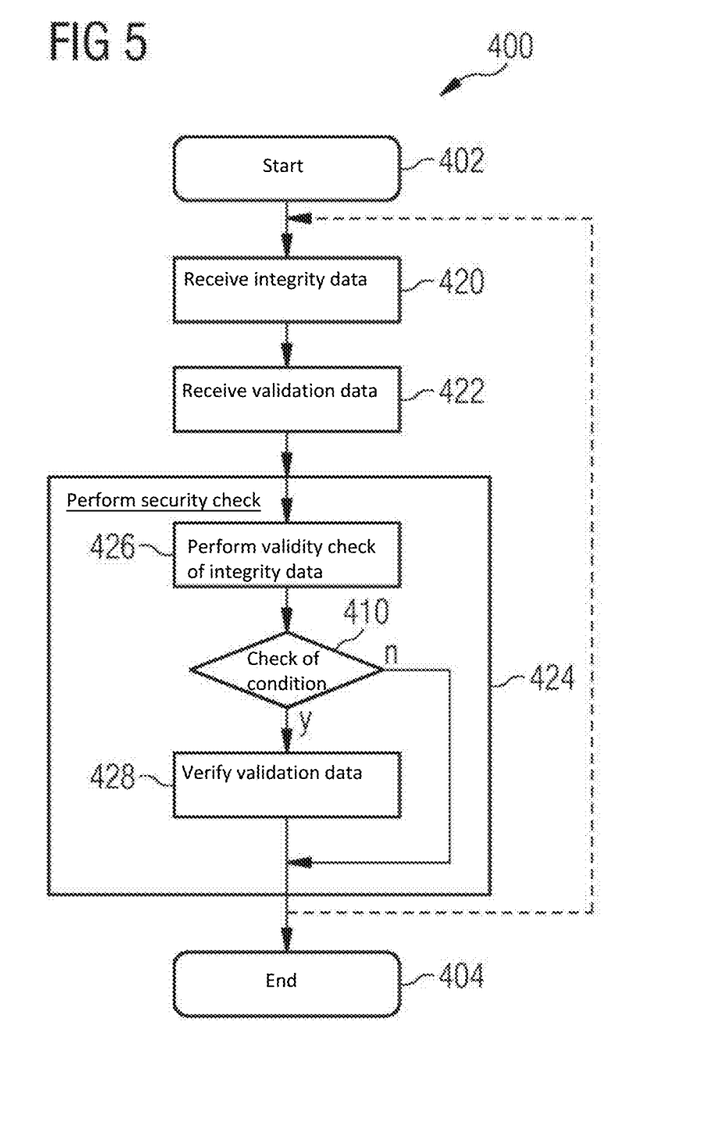
FIG. 5 represents a flowchart of a method for checking the security of a first data processing apparatus according to an embodiment.

In FIG. 5, a flowchart of a method 400 for checking the security of a first data processing apparatus is represented, the method 400 according to an embodiment.

According to an exemplary embodiment, the method 400 includes the method acts 420, 422, 424, and 426. In some advantageous modifications, the method 400 further includes the method act 428 and a method condition 410. The method 400 starts at the start of the method 402 and ends at the end of the method 404. Furthermore, one or more of the method acts, in particular a sequence of method acts and, (e.g., the whole method), may be performed, repeatedly. Moreover, the data processing apparatus is according to an embodiment of the present disclosure, and may be according to an exemplary embodiment of the first data processing apparatus 100 given with reference to FIG. 1. Moreover, the method 400 may be performed by a second data processing apparatus being configured to perform the method 400, and which in particular is according to an embodiment of the present disclosure, and which may more particularly be according to an exemplary embodiment of the method 200 given with reference to FIG. 2.

At act 420, integrity data is received from the first data processing apparatus.

At act 422, validation data is received from the first data processing apparatus.

At act 424, a security check of the first data processing apparatus is performed. The security check at least includes the method act 426. According to some advantageous modifications—as depicted in FIG. 5—the security check may also include the method condition 410 and/or the method act 428.

At method act 426, a validity check of the integrity data is performed based on the validation data.

At the optional but beneficial act 428, the validation data is verified based on a second digital signature, with which the validation data has been signed. This act may be performed depending on the result of act 426, such that act 428 is performed, when according to the condition 410 validity check of act 426 yielded a positive result, that is the integrity data being valid (indicated by "y" in FIG. 5), whereas act 428 is not performed, when act 426 yielded a negative result (indicated by "n" in FIG. 5).

According to some advantageous modifications, additional method acts may be performed depending on the security check, and thus, in particular depending on whether the integrity data is valid and/or whether the validation data has a valid second digital signature.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A first data processing apparatus configured to operate in accordance with one or more platform configurations, wherein the first data processing apparatus comprises:
   an attestation processor configured to establish attestation data, the attestation data being indicative of a current platform configuration of the one or more platform configurations; and
   a network interface; and
   a data storage device for storing validation data, the validation data facilitating a validity check of integrity data by a second data processing apparatus, wherein the integrity data comprises the attestation data, wherein the first data processing apparatus is configured to:
  retrieve the validation data from the data storage device, wherein the validation data comprises information regarding at least one predefined valid platform configuration in accordance with which the first data processing apparatus is configured to operate securely;
  run at least one software component comprising: an application that provides stored and/or computed application data to the second data processing apparatus and/or which requests application data from the second data processing apparatus, a hypervisor, a virtual machine, an operating system, a data space runtime environment, or a combination thereof;
  provide the integrity data and the validation data to the second data processing apparatus via the network interface for the validity check of the integrity data based on the validation data by determining whether the attestation data of the integrity data matches with the at least one predefined valid platform configuration of the validation data, wherein the integrity data and the validation data are specific for the at least one software component, and wherein the at least one software component and the validation data specific for the at least one software component are bundled into a bundled component image;
  receive the bundled component image from a server for component images;
  store the bundled component image on the data storage device; and
  retrieve the software component of the bundled component image from the data storage device for running the at least one software component.

2. The first data processing apparatus of claim 1, wherein the bundled component image is digitally signed by a digital signature, and
  wherein the first data processing apparatus is further configured to:
    verify the bundled component image based on the digital signature, and
    selectively run the software component of the bundled component image depending on the verification of the bundled component image.

3. The first data processing apparatus of claim 1, wherein the first data processing apparatus is further configured to provide at least one of the integrity data and the validation data being specific for the at least one software component by running an integrity module and/or a validity module of the at least one software component, and
  wherein:
    the integrity module is configured to establish specific integrity data by the attestation processor; and/or
    the validity module is configured to establish specific validation data by selecting and retrieving the specific validation data from the data storage device.

4. The first data processing apparatus of claim 1, wherein the attestation processor comprises one or more of the following:
  a trusted platform module;
  a cryptoprocessor configured to determine the current platform configuration and to generate the attestation data based on the current platform configuration;
  a processor configured to run a firmware or software module of the first data processing apparatus, which is configured to determine information indicative of the current platform configuration and to generate the attestation data based on the determined information; and/or
  a data interface configured to receive the attestation data from a hardware security module, wherein the hardware security module is configured to detect the information indicative of the current platform configuration and to generate the attestation data based on the detected information.

5. A system comprising:
  a first data processing apparatus; and
  a second data processing apparatus,
  wherein the first data processing apparatus comprises:
    an attestation processor configured to establish attestation data, the attestation data being indicative of a current platform configuration of one or more platform configurations;
    a network interface; and
    a data storage device for storing validation data, the validation data facilitating a validity check of integrity data by the second data processing apparatus, wherein the integrity data comprises the attestation data,
  wherein the first data processing apparatus is configured to:
    retrieve the validation data from the data storage device, wherein the validation data comprises information regarding at least one predefined valid platform configuration in accordance with which the first data processing apparatus is configured to operate securely;
    run at least one software component comprising: an application that provides stored and/or computed application data to the second data processing apparatus and/or which requests application data from the second data processing apparatus a hypervisor, a virtual machine, an operating system, a data space runtime environment, or a combination thereof;
    provide the integrity data and the validation data to the second data processing apparatus via the network interface, such that the integrity data and the validation data are specific for the at least one software component, wherein the at least one software component and the validation data that is specific for the at least one software component are bundled into a bundled component image;
    receive the bundled component image from a server for component images;
    store the bundled component image on the data storage device; and
    retrieve the software component of the bundled component image from the data storage device for running the at least one software component,
  wherein the second data processing apparatus is configured to:
    receive the integrity data from the first data processing apparatus via the network interface;
    receive the validation data from the first data processing apparatus via the network interface; and
    perform a security check of the first data processing apparatus, wherein the security check at least comprises the validity check of the integrity data based on the validation data by determining whether the attestation data of the integrity data matches with the at least one predefined valid platform configuration of the validation data.

6. The system of claim 5, wherein the first data processing apparatus is configured to provide application data to the second data processing apparatus via the network interface, wherein the application data is stored on the data storage device or another data storage device of the first data processing apparatus or computed by running at least one software component, and     wherein the second data processing apparatus is configured to selectively receive and/or process the application data from the first data processing apparatus depending on the security check.

7. The system of claim 5, wherein the first data processing apparatus is configured to receive application data from the second data processing apparatus via the network interface,     wherein the second data processing apparatus comprises a data storage device for the application data and/or is configured to run one or more applications, which provide stored and/or computed application data, and     wherein the second data processing apparatus is further configured and/or wherein the applications are configured to selectively provide application data to the first data processing apparatus depending on the security check.

8. The system of claim 5, wherein the integrity data comprises measurement data based on how the current platform configuration has been measured for establishing the attestation data, and     wherein the second data processing apparatus is configured to perform an integrity check by determining whether the attestation data matches with the measurement data, wherein the security check comprises the integrity check, such that the security check depends on both the validity check and the integrity check.

9. The system of claim 5, wherein the validation data is digitally signed by a digital signature, and     wherein the first data processing apparatus is configured to verify the validation data based on the digital signature, and selectively provide the integrity data, the validation data, the application data, request the application data depending on the verification of the validation data, or a combination thereof, and/or     wherein the second data processing apparatus is configured to verify the validation data based on the digital signature, wherein the security check comprises and depends on the verification of the validation data.

10. The system of claim 5, wherein the attestation processor of the first data processing apparatus is configured to digitally sign the integrity data by a digital signature, and     wherein the first data processing apparatus is configured to verify the integrity data based on the digital signature, and selectively provide the integrity data, the validation data, the application data, request the application data depending on the verification of the integrity data, or a combination thereof, and/or     wherein the second data processing apparatus is configured to verify the integrity data based on the digital signature, wherein the security check comprises and depends on the verification of the integrity data.

11. The system of claim 5, further comprising:

the server for the component images.

12. A method for proving a security of a first data processing apparatus, the method comprising:

receiving a bundled component image from a server for component images, wherein at least one software component and validation data specific for the at least one software component are bundled into a bundled component image, wherein the validation data comprises information regarding at least one predefined valid platform configuration in accordance with which the first data processing apparatus is configured to operate securely;

storing the bundled component image on a data storage device of the first data processing apparatus;

retrieving the software component of the bundled component image from the data storage device for running the at least one software component;

establishing attestation data by an attestation component of the first data processing apparatus, the attestation data being indicative of a current platform configuration of one or more platform configurations, in accordance with which the first data processing apparatus is configured to operate;

providing integrity data to a second data processing apparatus, the integrity data at least comprising the attestation data; and providing the validation data to the second data processing apparatus, wherein the validation data facilitates a validity check of the integrity data by determining whether the attestation data of the integrity data matches with the at least one predefined valid platform configuration of the validation data.

\* \* \* \* \*